US010666422B2

United States Patent
Xiao (10) Patent No.: US 10,666,422 B2
(45) Date of Patent: May 26, 2020

(54) DATA PROCESSING METHOD (71) Applicant: SHENZHEN CHINA STAR OPTOELECTRONICS TECHNOLOGY CO., LTD., Shenzhen, Guangdong (CN)

(72) Inventor: Guangxing Xiao, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 97 days.

(21) Appl. No.: 15/764,710

(22) PCT Filed: Jan. 30, 2018

(86) PCT No.: PCT/CN2018/074595
§ 371 (c)(1),
(2) Date: Mar. 29, 2018

(87) PCT Pub. No.: WO2019/127815
PCT Pub. Date: Jul. 4, 2019

(65) Prior Publication Data
US 2019/0207746 A1 Jul. 4, 2019

(30) Foreign Application Priority Data
Dec. 29, 2017 (CN) .......................... 2017 1 1499480

(51) Int. Cl.
*H04L 9/00* (2006.01)
*H04L 9/06* (2006.01)
(Continued)

(52) U.S. Cl.
CPC ............ *H04L 9/0618* (2013.01); *H04L 9/088* (2013.01); *G06F 7/5443* (2013.01); *G06Q 10/00* (2013.01);
(Continued)

(58) Field of Classification Search
CPC . H04L 9/00; H04L 9/06; H04L 9/0618; H04L 9/1833; H04L 9/14; H04L 9/0625;
(Continued)

(56) References Cited

U.S. PATENT DOCUMENTS

| 5,539,827 A * | 7/1996 | Liu ...................... H04L 9/0618 380/28 |
| 6,026,217 A * | 2/2000 | Adiletta ............... H04N 19/159 375/E7.093 |

(Continued)

FOREIGN PATENT DOCUMENTS

| CN | 1913680 A | 2/2007 |
| CN | 101950344 A | 1/2011 |

(Continued)

OTHER PUBLICATIONS

Symmetric Encryption Algorithm Using Chaotic and Non-Chaotic generators by Ahmed G. Radwan University, Cairo, Egypt pp. 16, Aug. 1, 2015 (Year: 2015).*

Primary Examiner — Jeffrey C Pwu
Assistant Examiner — Ali H. Cheema
(74) Attorney, Agent, or Firm — Leong C. Lei (57) ABSTRACT The invention provides a data processing method, comprising: S1: reading original algorithm data; S2: selecting algorithm data within default range from the original algorithm and obtaining a corresponding encryption parameter by using an encryption algorithm, wherein the encryption parameter comprising at least one of the following: encryption coefficient and encryption vector S3: inserting the encryption parameter into a default position in the original algorithm data to obtain encrypted algorithm data. The invention encrypts the algorithm data, and the encrypted data is similar to the original algorithm data, thereby greatly improving the security of data transmission.

10 Claims, 4 Drawing Sheets

(51) Int. Cl.

| | | |
|---|---|---|
| *H04L 9/08* | (2006.01) | |
| *H04L 9/14* | (2006.01) | |
| *G06Q 10/00* | (2012.01) | |
| *G06Q 10/04* | (2012.01) | |
| *H04N 7/167* | (2011.01) | |
| *G06F 7/544* | (2006.01) | |

(52) U.S. Cl.
CPC ............. *G06Q 10/047* (2013.01); *H04L 9/00* (2013.01); *H04L 9/06* (2013.01); *H04L 9/0625* (2013.01); *H04L 9/08* (2013.01); *H04L 9/0861* (2013.01); *H04L 9/14* (2013.01); *H04N 7/167* (2013.01)

(58) Field of Classification Search
CPC . H04L 9/0861; H04L 9/18; H04L 9/08; H04L 29/08; H04L 9/10; H04L 63/0428; G06Q 10/00; G06Q 10/047; H04N 7/167; H04N 3/063; H04N 19/159; G06F 7/5443; G06F 21/10; G06G 9/45533; G06K 9/00288
USPC ....... 380/28, 210; 726/1; 713/165, 189, 193; 382/118
See application file for complete search history.

(56) References Cited

U.S. PATENT DOCUMENTS

| | | | | |
|---|---|---|---|---|
| 9,946,810 | B1* | 4/2018 | Trepetin | H04L 63/0428 |
| 2004/0260950 | A1* | 12/2004 | Ougi | H04L 9/0833 |
| | | | | 726/1 |
| 2008/0209231 | A1* | 8/2008 | Kim | G06F 21/10 |
| | | | | 713/189 |
| 2010/0114621 | A1* | 5/2010 | Salle | G06Q 10/00 |
| | | | | 705/7.11 |
| 2011/0271121 | A1* | 11/2011 | Imamoto | G11B 20/0021 |
| | | | | 713/193 |
| 2012/0134496 | A1* | 5/2012 | Farkash | H04N 7/167 |
| | | | | 380/210 |
| 2013/0148868 | A1* | 6/2013 | Troncoso Pastoriza | G06K 9/00288 |
| | | | | 382/118 |
| 2014/0310521 | A1* | 10/2014 | Ichikawa | H04L 9/0861 |
| | | | | 713/165 |
| 2015/0293884 | A1* | 10/2015 | Cuturi Cameto | G06F 17/18 |
| | | | | 708/201 |
| 2016/0197726 | A1* | 7/2016 | Yasuda | H04L 9/14 |
| | | | | 380/28 |
| 2017/0118016 | A1* | 4/2017 | Shibutani | H04L 9/0625 |
| 2018/0082078 | A1* | 3/2018 | Suzuki | G06F 16/258 |
| 2018/0197067 | A1* | 7/2018 | Mody | G06N 3/063 |
| 2019/0236270 | A1* | 8/2019 | Yamane | G06F 9/45533 |

FOREIGN PATENT DOCUMENTS

| | | | | | |
|---|---|---|---|---|---|
| CN | 103916456 | A | * | 7/2014 | ............. H04L 29/08 |
| CN | 105022961 | A | | 11/2015 | |
| JP | 200520735 | A | * | 1/2005 | ............... H04L 9/10 |
| WO | WO-2013044305 | A1 | * | 4/2013 | ............... H04L 9/06 |

* cited by examiner

DATA PROCESSING METHOD

RELATED APPLICATIONS

The present application is a National Phase of International Application Number PCT/CN2018/074595, filed Jan. 30, 2018, and claims the priority of China Application No. 201711499480.0, filed Dec. 29, 2017.

BACKGROUND OF THE INVENTION

1. Field of the Invention

The present invention relates to the field of data processing techniques, and in particular to a data processing method applicable to TCON chip.

2. The Related Arts

The glass substrate size used by the current panel manufacturers is larger and larger due to new technology, the panel size is also larger and larger, such as 65", 85", 110", and so on. Because the quality of the panels from each manufacturer is different, each panel manufacturer must develop algorithm targeting own panels to compensate for the shortcomings and challenges.

Figure 1:
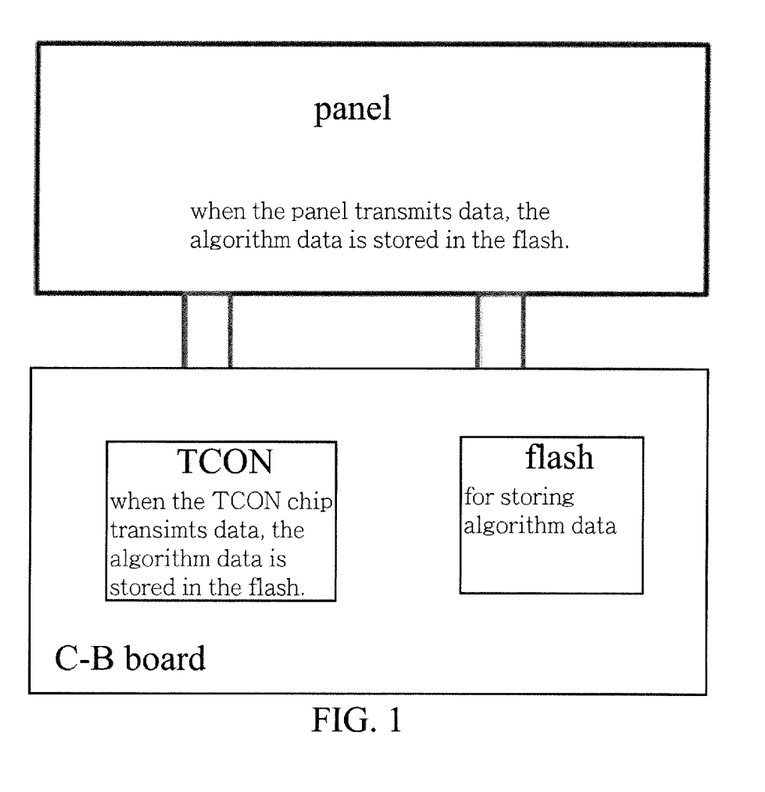
FIG. 1 is a schematic view showing the structure of a known panel and TCON chip.

Refer to FIG. 1. When the known panel and the TCON chip transmit data, the algorithm data is usually stored in an external flash memory. As a result, if the B panel manufacturer uses the algorithm from the A panel manufacturer, the B panel manufacturer only needs to replace the algorithm data of the A panel with the corresponding algorithm data of the B panel, leading to the cracking of the algorithm.

Figure 2:
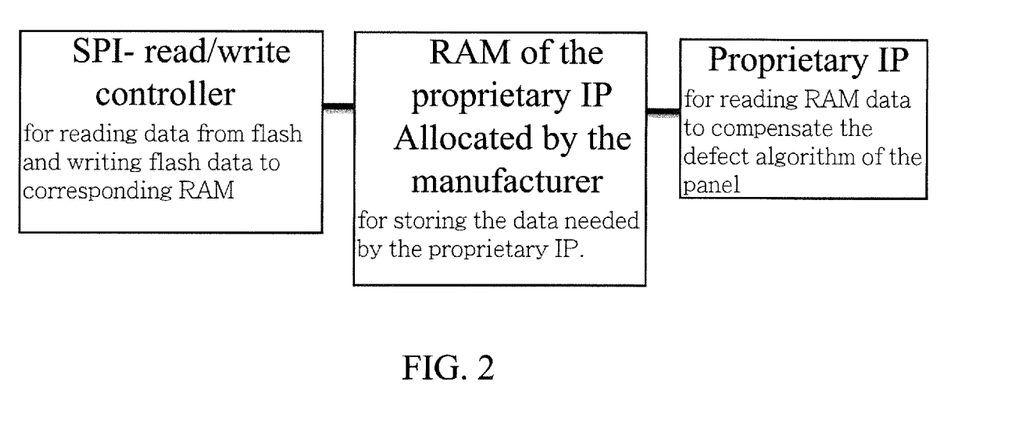
FIG. 2 is a schematic view showing the modules of the known panel and TCON chip.

As shown in FIG. 2, in the known collaboration framework of the panel and TCON chip, including: SPI read/write controller, RAM, and proprietary IP unit, wherein:

SPI read/write controller is mainly for reading data from flash, and writing flash data to corresponding RAM or registers;

the RAM of the proprietary IP allocated by the manufacturer is mainly for storing the data needed by the proprietary IP;

the proprietary IP unit is mainly for reading RAM data to compensate the defect algorithm of the panel.

The data transmitted in the process of panel and TCON chip data transmission is all original algorithm data, which cannot solve the problem that the algorithm data is easy to crack.

Therefore, a data process method must be provided to address the above issues.

SUMMARY OF THE INVENTION

To overcome the aforementioned disadvantages, the object of the present invention is to provide a data processing method, to encrypt the algorithm data of the TCON chip.

To achieve the above object, the present invention provides a data processing method, comprising:

S1: reading original algorithm data;

S2: selecting algorithm data within default range from the original algorithm and obtaining a corresponding encryption parameter by using an encryption algorithm, wherein the encryption parameter comprising at least one of the following: encryption coefficient and encryption vector;

S3: inserting the encryption parameter into a default position in the original algorithm data to obtain encrypted algorithm data.

According to a preferred embodiment of the present invention, the algorithm data selected in step S2 have same bit width and have values within the default range.

According to a preferred embodiment of the present invention, in step S2, the encryption parameter has a bit width the same as the bit width of the selected algorithm data, and the encryption parameter has a value within the default range.

According to a preferred embodiment of the present invention, the encryption parameter in step S2 is encryption coefficient, and the encryption coefficient is at least one of $A_i$ (i=1, 2, 3 ... N), N is the number of encryption coefficients, and the weights corresponding to the original algorithm data $B_1, B_2, B_3, \ldots B_n$ are respectively $\alpha_1, \alpha_2, \alpha_3 \ldots \alpha_n$, and the sum of all the weights is 1 or approaching 1; and the encryption coefficient $A_i$ is obtained as follows:

arranging weights $\alpha_1, \alpha_2, \alpha_3 \ldots \alpha_n$ according to N types of orders, and algorithm data according to order of $B_1, B_2, B_3, \ldots B_n$;

for an i-th order arrangement of weights, multiplying all weights $\alpha$ with original algorithm data B at corresponding position respectively, summing the results of the multiplication to obtain the corresponding encryption coefficient $A_i$.

According to a preferred embodiment of the present invention, the encryption parameter in step S2 is encryption vector, and the encryption vector is at least one of $D_j$ (j=1, 2, 3 ... M), M is the number of encryption vectors, and the weights corresponding to the original algorithm data $B_1, B_2, B_3, \ldots B_n$ are respectively $\alpha_1, \alpha_2, \alpha_3 \ldots \alpha_n$, and the sum of all the weights is 1 or approaching 1; and the encryption coefficient $D_j$ is obtained as follows:

arranging weights $\alpha_1, \alpha_2, \alpha_3 \ldots \alpha_n$ according to N types of orders, and algorithm data according to order of $B_1, B_2, B_3, \ldots B_n$;

for an i-th order arrangement of weights, multiplying all weights $\alpha$ with original algorithm data B at corresponding position respectively, summing the results of the multiplication to obtain the corresponding encryption coefficient $A_i$;

adding all or a portion of encryption coefficient $A_i$ to the original algorithm data to obtain new data vector $\{C_1, C_2, C_3, \ldots, C_m\}$; m being the sum of the number n of original algorithm data and the number of added encryption coefficients;

the weights corresponding to the data vector $C_1, C_2, C_3, \ldots C_m$ being respectively $\beta_1, \beta_2, \beta_3 \ldots \beta_m$, and the sum of all the weights being 1 or approaching 1;

arranging weights $\beta_1, \beta_2, \beta_3 \ldots \beta_m$, according to M types of orders, and data vector according to order of $C_1, C_2, C_3, \ldots C_m$;

for a j-th order arrangement of weights, multiplying all weights $\beta$ with data vector C at corresponding position respectively, summing the results of the multiplication to obtain the corresponding encryption coefficient $D_j$.

According to a preferred embodiment of the present invention, the step of arranging weights $\alpha_1, \alpha_2, \alpha_3 \ldots \alpha_n$ according to N types of orders is specifically as:

one or more combinations of arranging weights $\alpha$ in the following orders: decreasing order according to subscript n, increasing order according to subscription n, forward arrangement according to a certain value of subscription n, backward arrangement according to a certain value of subscription n, odd numbers first followed by even numbers, and even numbers first followed odd numbers.

According to a preferred embodiment of the present invention, the step of arranging weights $\beta_1, \beta_2, \beta_3 \ldots \beta_m$ according to M types of orders is specifically as:

one or more combinations of arranging weights β in the following orders: decreasing order according to subscript m, increasing order according to subscription m, forward arrangement according to a certain value of subscription m, backward arrangement according to a certain value of subscription m, odd numbers first followed by even numbers, and even numbers first followed odd numbers.

According to a preferred embodiment of the present invention, the default range used in step S2 to select from the original algorithm data is a continuous range.

According to a preferred embodiment of the present invention, the default range used in step S2 to select from the original algorithm data comprises discrete ranges.

According to a preferred embodiment of the present invention, the method further comprises, after step S3:

using a decryption algorithm to decrypt the encrypted algorithm data, and the decryption algorithm being a inverse computation of the encryption algorithm.

The present invention performs encryption on the algorithm data, and the encrypted algorithm data is similar to the original algorithm data; hence, the present invention greatly improve the security of data transmission.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To enable those skilled in the art to better understand the technical solutions in the present invention, the technical solutions in the embodiments of the present invention are clearly and completely described in the following with reference to the accompanying drawings in the embodiments of the present invention. Apparently, the described embodiments are only a part but not all of the embodiments of the present invention. All other embodiments obtained by a person of ordinary skill in the art based on the embodiments of the present invention without creative efforts shall fall within the protection scope of the present invention.

Figure 3:
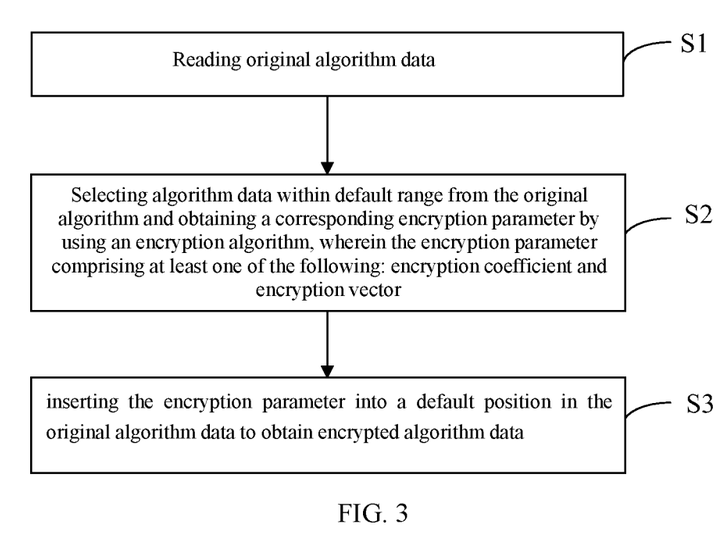
FIG. 3 is a schematic view showing a flowchart of the data processing method according to a preferred embodiment of the present invention.

Referring to FIG. 3, the present invention provides a data processing method, comprising:

S1: reading original algorithm data;

S2: selecting algorithm data within default range from the original algorithm and obtaining a corresponding encryption parameter by using an encryption algorithm, wherein the encryption parameter comprising at least one of the following: encryption coefficient and encryption vector;

S3: inserting the encryption parameter into a default position in the original algorithm data to obtain encrypted algorithm data.

Preferably, the data selected in step S2 have same bit width and have values within the default range.

Preferably, in step S2, the encryption parameter has a bit width the same as the bit width of the selected algorithm data, and the encryption parameter has a value within the default range. For example, the encryption parameter needs to be between the maximum value and the minimum value of the surrounding algorithm data, the data size of the encryption parameter does not change too much, so that the insertion of encryption parameter is not easy to be discovered.

The inserted encryption parameter may be encryption coefficient, encryption vector, or encryption coefficient and encryption vector.

Specifically, the encryption parameter is at least one of $A_i$ (i=1, 2, 3 . . . N), N is the number of encryption coefficients, and the weights corresponding to the original algorithm data $B_1, B_2, B_3, \ldots B_n$ are respectively $\alpha_1, \alpha_2, \alpha_3 \ldots \alpha_n$, and the sum of all the weights is 1 or approaching 1;

the encryption coefficient $A_i$ is obtained as follows:

arranging weights $\alpha_1, \alpha_2, \alpha_3 \ldots \alpha_n$ according to N types of orders, and algorithm data according to order of $B_1, B_2, B_3, \ldots B_n$;

for an i-th order arrangement of weights, multiplying all weights α with original algorithm data B at corresponding position respectively, summing the results of the multiplication to obtain the corresponding encryption coefficient $A_i$.

The encryption parameter is at least one of $D_j$ (j=1, 2, 3 . . . M), M is the number of encryption vectors, and the weights corresponding to the original algorithm data $B_1, B_2, B_3, \ldots B_n$ are respectively $\alpha_1, \alpha_2, \alpha_3 \ldots \alpha_n$, and the sum of all the weights is 1 or approaching 1;

the weights corresponding to the data vector $C_1, C_2, C_3, \ldots C_m$ being respectively $\beta_1, \beta_2, \beta_3 \ldots \beta_m$, and the sum of all the weights being 1 or approaching 1;

the encryption coefficient $D_j$ is obtained as follows:

arranging weights $\alpha_1, \alpha_2, \alpha_3 \ldots \alpha_n$ according to N types of orders, and algorithm data according to order of $B_1, B_2, B_3, \ldots B_n$;

for an i-th order arrangement of weights, multiplying all weights α with original algorithm data B at corresponding position respectively, summing the results of the multiplication to obtain the corresponding encryption coefficient $A_i$;

adding all or a portion of encryption coefficient $A_i$ to the original algorithm data to obtain new data vector $\{C_1, C_2, C_3, \ldots, C_m\}$; m being the sum of the number n of original algorithm data and the number of added encryption coefficients;

arranging weights $\beta_1, \beta_2, \beta_3 \ldots \beta_m$, according to M types of orders, and data vector according to order of $C_1, C_2, C_3, \ldots C_m$;

for a j-th order arrangement of weights, multiplying all weights β with data vector C at corresponding position respectively, summing the results of the multiplication to obtain the corresponding encryption coefficient $D_j$.

In the present invention, arranging weights α and β in one or more combinations in the following orders: decreasing order according to subscript n or m, increasing order according to subscription n or m, forward arrangement according to a certain value of subscription n or m, backward arrangement according to a certain value of subscription n or m, odd numbers first followed by even numbers, and even numbers first followed odd numbers.

Moreover, the default range used in step S2 to select from the original algorithm data is a continuous range or discrete range; the discrete range can further enhance encryption security and make cracking the encryption harder.

Furthermore, the method further comprises, after step S3:

using a decryption algorithm to decrypt the encrypted algorithm data, and the decryption algorithm being a inverse computation of the encryption algorithm.

Figure 4:
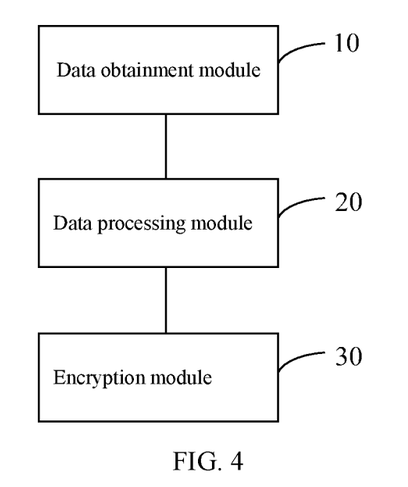
FIG. 4 is a schematic view showing the modules of a data processing system according to a preferred embodiment of the present invention.

As shown in FIG. 4, the present invention also provides a data processing system, comprising:

a data obtainment module 10, for reading original algorithm data;

a data processing module 20, for selecting algorithm data within default range from the original algorithm and obtaining a corresponding encryption parameter by using an encryption algorithm, wherein the encryption parameter comprising at least one of the following: encryption coefficient and encryption vector;

an encryption module, for inserting the encryption parameter into a default position in the original algorithm data to obtain encrypted algorithm data.

Preferably, the data processing module 20 comprises a plurality of adders and multipliers, and the computation of the encryption coefficients and the encryption vectors are performed by adders and multipliers.

Also, the data processing module 20 is further used to decrypt the encrypted algorithm data, and the decryption algorithm is an inverse process of the encryption algorithm. In decryption process, the adders and multipliers are fully utilized to achieve time-sharing, and reducing the consumption of internal resources.

The following describes the present invention with specific embodiments.

Embodiment 1

Figure 5:
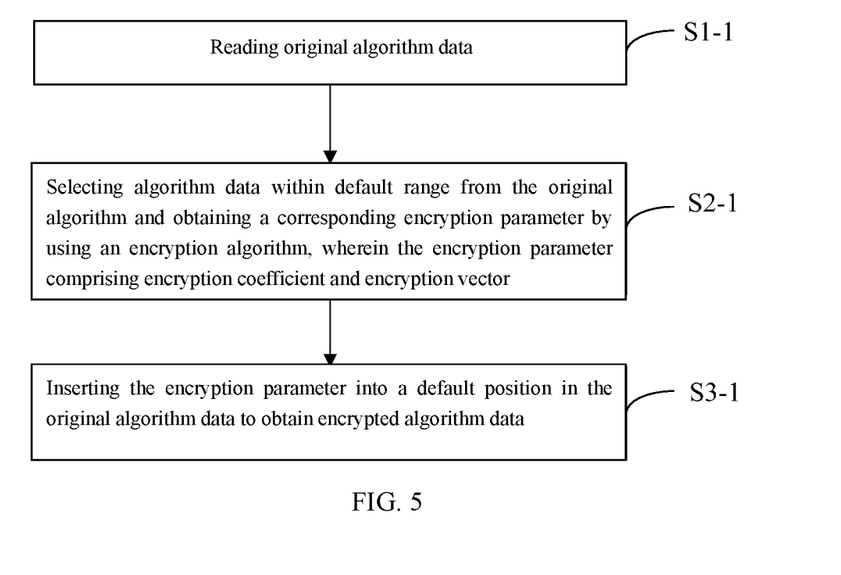
FIG. 5 is a schematic view showing a flowchart of the data processing method according to the first embodiment of the present invention.

Refer to FIG. 5. In the present embodiment, the data processing method comprises:

S1-1: reading original algorithm data.

S2-1: selecting algorithm data within default range from the original algorithm and obtaining a corresponding encryption parameter by using an encryption algorithm, wherein the encryption parameter comprising encryption coefficient and encryption vector.

In the present embodiment, a continuous range is used to select algorithm data. In other embodiments, discrete ranges can be used to select algorithm data to further enhance encryption security.

The selection of algorithm data must meet the following conditions: 1. same bit width (e.g., all have 8 bits), 2. data size does not change much, and 3. Parameter insertion is not easy to be discovered.

The requirement for encryption parameter having the same bit width as the selected algorithm data.

The encryption parameter to be inserted is at least one of the $A_i$ (i=1, 2, 3 ... N), and N is the number of encryption coefficients.

The weights corresponding to the original algorithm data $B_1, B_2, B_3, \ldots B_n$ are respectively $\alpha_1, \alpha_2, \alpha_3 \ldots \alpha_n$, and the sum of all the weights is 1 or approaching 1;

the encryption coefficient $A_i$ is obtained as follows:

arranging weights $\alpha_1, \alpha_2, \alpha_3 \ldots \alpha_n$ according to N types of orders, and the algorithm data according to order of $B_1, B_2, B_3, \ldots B_n$;

for an i-th order arrangement of weights, multiplying all weights α with original algorithm data B at corresponding position respectively, summing the results of the multiplication to obtain the corresponding encryption coefficient $A_i$.

The arrangement order of the weights $\alpha_1, \alpha_2, \alpha_3 \ldots \alpha_n$ comprises:

one or more combinations of arranging weights α in the following orders: decreasing order according to subscript n, increasing order according to subscription n, forward arrangement according to a certain value of subscription n, backward arrangement according to a certain value of subscription n, odd numbers first followed by even numbers, and even numbers first followed odd numbers.

For example:

In the first coefficient, increasing order according to subscription n, i.e., 1, 2, 3, . . . , n, then:

$$A_1 = \alpha_1 * B_1 + \alpha_2 * B_2 + \alpha_3 * B_3 + \alpha_4 * B_4 + \alpha_5 * B_5 + \ldots + \alpha_n * B_n.$$

In the second coefficient, decreasing order according to subscription n, i.e., n, n−1, n−2, . . . , 1, then:

$$A_2 = \alpha_n * B_1 + \alpha_{n-1} * B_2 + \alpha_{n-2} * B_3 + \alpha_{n-3} * B_4 + \alpha_{n-4} * B_5 + \ldots + \alpha_1 * B_n.$$

In the third coefficient, forward arrangement according to n=4, i.e., 4, 5, 6, . . . , n, 1, 2, 3, then:

$$A_3 = \alpha_4 * B_1 + \alpha_5 * B_2 + \alpha_6 * B_3 + \ldots + \alpha_n * B_{n-3} + \alpha_1 * B_{n-2} + \alpha_2 * B_{n-1} + \alpha_3 * B_n.$$

In the fourth coefficient, backward arrangement according to n=4, i.e., 4, 3, 2, 1, n, n−1, . . . , 5, then:

$$A_4 = \alpha_4 * B_1 + \alpha_3 * B_2 + \alpha_2 * B_3 + \alpha_1 * B_4 + \ldots + \alpha_6 * B_{n-1} + \alpha_5 * B_n.$$

In the fifth coefficient, decreasing order of odd numbers followed by decreasing order of even numbers of n, i.e., 1, 3, 5, . . . , 2, 4, 6, . . . , then:

When n is an odd number, $$A_5 = \alpha_1 * B_1 + \alpha_3 * B_2 + \alpha_5 * B_3 + \ldots + \alpha_n * B_{(n+1)/2} + \alpha_2 * B_{(n+1)/2+1} + \alpha_{n-1} * B_n;$$

When n is an even number, $$A_5 = \alpha_1 * B_1 + \alpha_3 * B_2 + \alpha_5 * B_3 + \ldots + \alpha_{n-1} * B_{n/2} + \alpha_2 * B_{n/2+1} + \ldots + \alpha_n * B_n.$$

Each encryption coefficient can be computed by changing the arrangement order of the subscript n.

The above five encryption coefficients are computed by preferred arrangement orders. In other embodiments, the coefficients can be computed by other regular or irregular arrangement orders.

The encryption parameter to be inserted is at least one of $D_j$ (j=1, 2, 3 ... M), M is the number of encryption vectors, and the weights corresponding to the data vector $C_1, C_2, C_3, \ldots C_m$ being respectively $\beta_1, \beta_2, \beta_3 \ldots \beta_m$, and the sum of all the weights being 1 or approaching 1;

the encryption coefficient $D_j$ is obtained as follows:

adding all or a portion of the above five encryption coefficients $A_i$ to the original algorithm data to obtain new data vector $\{C_1, C_2, C_3, \ldots, C_m\}$; m being the sum of the number n of original algorithm data and the number of added encryption coefficients;

arranging weights $\beta_1, \beta_2, \beta_3 \ldots \beta_m$, according to M types of orders, and data vector according to order of $C_1, C_2, C_3, \ldots C_m$;

for a j-th order arrangement of weights, multiplying all weights $\beta$ with data vector C at corresponding position respectively, summing the results of the multiplication to obtain the corresponding encryption coefficient $D_j$.

The arrangement order of the weights $\beta_1, \beta_2, \beta_3 \ldots \beta_m$ comprises:

one or more combinations of arranging weights $\beta$ in the following orders: decreasing order according to subscript m, increasing order according to subscription m, forward arrangement according to a certain value of subscription m, backward arrangement according to a certain value of subscription m, odd numbers first followed by even numbers, and even numbers first followed odd numbers.

For example:

In the first coefficient, increasing order according to subscription m, i.e., 1, 2, 3, ..., m, then:

$$A_1 = \beta_1{}^*C_1 + \beta_2{}^*C_2 + \beta_3{}^*C_3 + \beta_4{}^*C_4 + \beta_5{}^*C_5 + \ldots + \beta_m{}^*C_m.$$

In the second coefficient, decreasing order according to subscription m, i.e., m, m−1, m−2, ..., 1, then:

$$A_2 = \beta_m{}^*C_1 + \beta_{m-1}{}^*C_2 + \beta_{m-2}{}^*C_3 + \beta_{m-3}{}^*C_4 + \beta_{m-4}{}^*C_5 + \ldots + \beta_1{}^*C_m.$$

In the third coefficient, forward arrangement according to m=4, i.e., 4, 5, 6, ..., m, 1, 2, 3, then:

$$A_3 = \beta_4{}^*C_1 + \beta_5{}^*C_2 + \beta_6{}^*C_3 + \ldots + \beta_m{}^*C_{m-3} + \beta_1{}^*C_{m-2} + \beta_2{}^*C_{m-1} + \beta_3{}^*C_m.$$

In the fourth coefficient, backward arrangement according to m=4, i.e., 4, 3, 2, 1, m, m−1, ..., 5, then:

$$A_4 = \beta_4{}^*C_1 + \beta_3{}^*C_2 + \beta_2{}^*C_3 + \beta_1{}^*C_4 + \ldots + \beta_6{}^*C_{m-1} + \beta_5{}^*C_m.$$

In the fifth coefficient, decreasing order of odd numbers followed by decreasing order of even numbers of m, i.e., 1, 3, 5, ..., 2, 4, 6, ..., then:

When m is an odd number, $$A_5 = \beta_1{}^*C_1 + \beta_3{}^*C_2 + \beta_5{}^*C_3 + \ldots + \beta_{m-1}{}^*C_{m/2} + \beta_2{}^*C_{m/2+1} + \ldots + \beta_m{}^*C_m;$$

When m is an even number, $$A_5 = \beta_1{}^*C_1 + \beta_3{}^*C_2 + \beta_5{}^*C_3 + \ldots + \beta_{m-1}{}^*C_{m/2} + \beta_2{}^*C_{m/2+1} + \ldots + \beta_m{}^*C_m.$$

Each encryption vector can be computed by changing the arrangement order of the subscript m.

The above five encryption vectors are computed by preferred arrangement orders. In other embodiments, the encryption vectors can be computed by other regular or irregular arrangement orders.

S3-1: inserting the encryption coefficient and encryption vector into a default position in the final data of the flash memory.

Then, the decryption can be performed on the algorithm data. The decryption process is the inverse computation of the encryption process. In decryption process, the adders and the multipliers used in the encryption process can be fully utilized to achieve time-sharing, and reducing the consumption of internal resources. When the decrypted encryption coefficients and encryption vectors are found to not match with the actual situation, the algorithm can be run correctly for more than ten minutes, and then randomize all the data.

Embodiment 2

Figure 6:
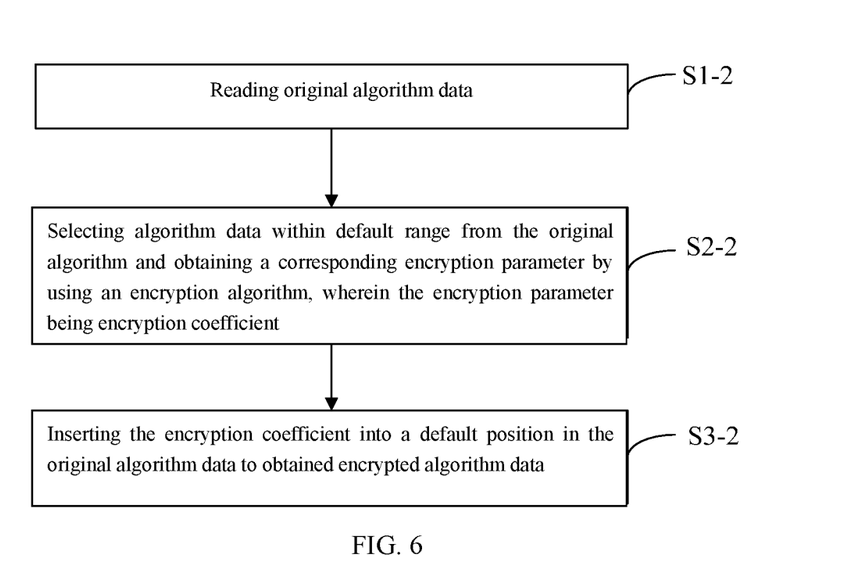
FIG. 6 is a schematic view showing a flowchart of the data processing method according to the second embodiment of the present invention.

As shown in FIG. 6, in the present embodiment, the data processing method comprises:

S1-2: reading original algorithm data.

S2-2: selecting algorithm data within default range from the original algorithm and obtaining a corresponding encryption parameter by using an encryption algorithm, wherein the encryption parameter being encryption coefficient.

The selection of algorithm data must meet the following conditions: 1. same bit width (e.g., all have 8 bits), 2. data size does not change much, and 3. Parameter insertion is not easy to be discovered.

The requirement for encryption coefficient: having the same bit width as the selected algorithm data.

The encryption coefficient $A_i$ is computed by the same method used in Embodiment 1, and will not be repeated here.

S3-2: inserting the encryption coefficient into a default position in the original algorithm data to obtained encrypted algorithm data.

After inserting the encryption coefficient into a default position, the final data of the flash memory is obtained.

Then, the decryption can be performed on the algorithm data. The decryption process is the inverse computation of the encryption process. In decryption process, the adders and the multipliers used in the encryption process can be fully utilized to achieve time-sharing, and reducing the consumption of internal resources. When the decrypted encryption coefficients and encryption vectors are found to not match with the actual situation, the algorithm can be run correctly for more than ten minutes, and then randomize all the data.

Embodiment 3

Figure 7:
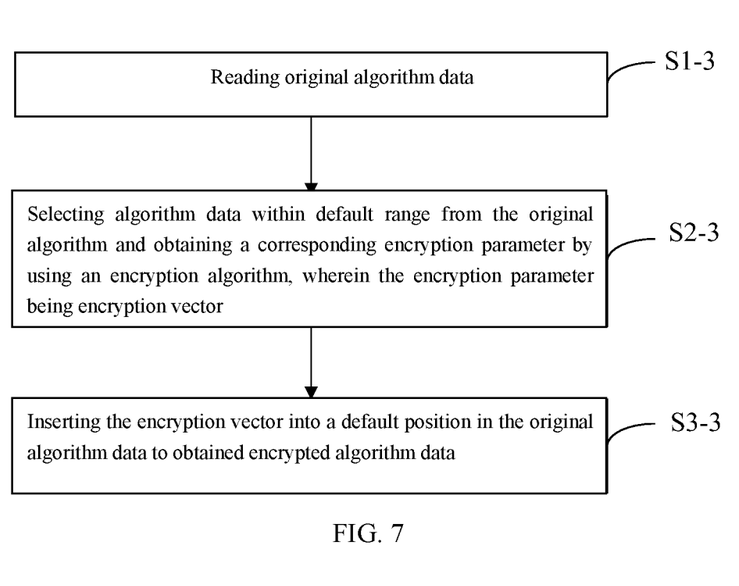
FIG. 7 is a schematic view showing a flowchart of the data processing method according to the third embodiment of the present invention.

As shown in FIG. 7, in the present embodiment, the data processing method comprises:

S1-3: reading original algorithm data.

S2-3: selecting algorithm data within default range from the original algorithm and obtaining a corresponding encryption parameter by using an encryption algorithm, wherein the encryption parameter being encryption vector.

The selection of algorithm data must meet the following conditions: 1. same bit width (e.g., all have 8 bits), 2. data size does not change much, and 3. Parameter insertion is not easy to be discovered.

The requirement for encryption vector having the same bit width as the selected algorithm data.

The encryption vector $D_j$ is computed by the same method used in Embodiment 1, and will not be repeated here.

S3-3: inserting the encryption vector into a default position in the original algorithm data to obtained encrypted algorithm data.

After inserting the encryption vector into a default position, the final data of the flash memory is obtained.

Then, the decryption can be performed on the algorithm data. The decryption process is the inverse computation of the encryption process. In decryption process, the adders and the multipliers used in the encryption process can be fully utilized to achieve time-sharing, and reducing the consumption of internal resources. When the decrypted encryption coefficients and encryption vectors are found to not match with the actual situation, the algorithm can be run correctly for more than ten minutes, and then randomize all the data.

Preferably, the data processing method of the present invention is applied to the TCON chip for realizing the data transmission between the TCON chip and the panel. Of course, the data processing method can also be applied to the data transmission between other chips and the terminal product in other embodiments.

An embodiment of the present invention further provides an electronic device. The electronic device comprises at least a processor and a memory coupled to the at least a processor for storing instructions executable by the at least a processor; when the instructions executable being executed by the at least a processor, the at least a processor performs the data processing method in the above embodiment.

An embodiment of the present invention further provides a non-volatile storage medium storing computer-executable instructions, and the computer-executable instructions are configured to execute the above data processing method.

An embodiment of the present invention further provides a computer program product. The computer program product comprises a computer program stored on a non-volatile computer-readable storage medium. The computer program comprises program instructions. When the program instructions are executed by a computer, the computer performs to execute the above data processing method.

The data processing system provided in the embodiment of the present invention may execute the data processing method provided by any embodiment of the present invention, and may comprise the corresponding functional modules corresponding to the execution method and beneficial effects. For technical details not described in the foregoing embodiments, reference may be made to the data processing method provided by any embodiment of the present invention.

As shown in the above embodiments, the present invention encrypts the algorithm data, and the encrypted data is similar to the original algorithm data, thereby greatly improving the security of data transmission.

Any process or method descriptions described in flowcharts or otherwise herein may be understood to mean modules that include code for one or more executable instructions that implement the steps of a particular logical function or process, section or part, and the scope of the preferred embodiments of the invention includes additional implementations where executions may not be performed in the order shown or discussed, including according to the functions involved, in substantially simultaneous fashion or in reverse order, which should be understood by those skilled in the art to which the embodiments of the present invention belong.

The logic and/or steps shown in the flowcharts or otherwise described herein, for example, may be thought of as an ordered listing of executable instructions for implementing logic functions, which may be embodied in any computer-readable medium, for use by or in connection with an instruction execution system, apparatus, or device (such as a computer-based system, a processor-included system, or other system that fetch instructions from an instruction execution system, apparatus, or device and execute the instructions), or equipment. For the purposes of this description, "computer-readable medium" may be any means that can contain, store, communicate, propagate, or transport the program for use by or in connection with the instruction execution system, apparatus, or device. More specific examples (non-exhaustive list) of computer-readable media include the following: electrical connections (mobile terminals) with one or more wires, a portable disk cartridge (magnetic device), a random access memory (RAM), ROM, EPROM or flash memory, optical fiber devices, and CD ROM. In addition, the computer-readable medium can even be paper or other suitable medium upon which the program can be printed, as may be done, for example, by optically scanning the paper or other medium, followed by editing, interpreting or, optionally, processed in a suitable manner to electronically obtain the program, which is then stored in a computer memory.

It should be understood that various portions of the present invention may be implemented in hardware, software, firmware, or a combination thereof. In the above embodiments, multiple steps or methods may be implemented in software or firmware stored in memory and executed by a suitable instruction execution system. For example, if implemented in hardware, as in another embodiment, any of the following techniques well known in the art or a combination thereof may be used: logic gates having logic gates for implementing data functions on data signals, discrete logic, a dedicated integrated circuit with a suitable combinational logic gate, a programmable gate array (PGA), a field programmable gate array (FPGA), and the like.

A person of ordinary skill in the art may understand that, all or a part of the steps carried in the methods in the foregoing embodiments may be implemented by a program instructing relevant hardware. The program may be stored in a computer readable storage medium, when executed, one of the steps of the method embodiment or a combination thereof is included. In addition, each functional unit in each embodiment of the present invention may be integrated into one processing module, or each of the units may exist alone physically, or two or more units may be integrated into one module. The above-mentioned integrated module can be implemented in the form of hardware, or in the form of software function module. When the integrated module is implemented in the form of a software function module and is sold or used as an independent product, the integrated module may also be stored in a computer readable storage medium.

The above-mentioned storage medium may be a read-only memory, a magnetic disk, an optical disc or the like. Although the embodiments of the present invention have been shown and described above, it should be understood that the above embodiments are merely exemplary and should not be construed as limiting the present invention. Those skilled in the art may, within the scope of the present invention, to change, modify, replace and transform he embodiments.

It will be apparent to those skilled in the art that the invention is not limited to the details of the foregoing exemplary embodiments, but that the present invention may be embodied in other specific forms without departing from the spirit or essential characteristics of the invention. Thus, the present examples are to be considered in all respects as illustrative and not restrictive, the scope of the invention being indicated by the appended claims rather than by the foregoing description, and thus is intended to be included in the claims, All changes which come within the meaning and range of equivalency of the appended claims are intended to be embraced therein. Any reference signs in the claims should not be construed as limiting the claim involved.

In addition, it should be understood that although the specification is described according to the embodiments, not every embodiment includes only one independent technical solution. This description of the specification is merely for the sake of clarity and the person skilled in the art should consider the specification as a whole, the technical solutions in the embodiments may also be combined as appropriate to form other embodiments that can be understood by those skilled in the art.

What is claimed is:

1. A data processing method, comprising:

S1: reading original algorithm data;

S2: selecting algorithm data within a default range from the original algorithm data and obtaining a corresponding encryption parameter by using an encryption algorithm, wherein the encryption parameter comprising at least one of the following: encryption coefficient and encryption vector;

S3: inserting the encryption parameter into a predetermined position in the original algorithm data to obtain encrypted algorithm data;

wherein the encryption parameter in step S2 is encryption coefficient, and the encryption coefficient is at least one of $A_i$ (i=1, 2, 3 ... N), N is the number of encryption coefficients, and the weights corresponding to the original algorithm data $B_1, B_2, B_3, \ldots Bn$ are respectively $\alpha_1, \alpha_2, \alpha_3 \ldots \alpha_n$, and the sum of all the weights is 1 or approaching 1, and the encryption coefficient $A_i$ is obtained as follows:

arranging weights $\alpha_1, \alpha_2, \alpha_3 \ldots \alpha_n$, according to N types of orders, and algorithm data according to order of $B_1, B_2, B_3, \ldots Bn$:

for an i-th order arrangement of weights, multiplying all weights α with original algorithm data B at corresponding position respectively, summing the results of the multiplication to obtain the corresponding encryption coefficient $A_i$.

2. The data processing method as claimed in claim 1, wherein the algorithm data selected in step S2 have same bit width and have values within the default range.

3. The data processing method as claimed in claim 2, wherein in step S2, the encryption parameter has a bit width the same as the bit width of the selected algorithm data, and the encryption parameter has a value within the default range.

4. The data processing method as claimed in claim 1, wherein the encryption parameter in step S2 is encryption vector, and the encryption vector is at least one of $D_j$ (j=1, 2, 3 ... M), M is the number of encryption vectors, and the weights corresponding to the original algorithm data $B_1, B_2, B_3, \ldots B$, are respectively $\alpha_1, \alpha_2, \alpha_3 \ldots \alpha_n$, and the sum of all the weights is 1 or approaching 1; and the encryption coefficient $D_j$ is obtained as follows:

arranging weights $\alpha_1, \alpha_2, \alpha_3 \ldots \alpha_n$ according to N types of orders, and algorithm data according to order of $B_1, B_2, B_3, \ldots Bn$;

for an i-th order arrangement of weights, multiplying all weights α with original algorithm data B at corresponding position respectively, summing the results of the multiplication to obtain the corresponding encryption coefficient $A_i$;

adding all or a portion of encryption coefficient $A_i$ to the original algorithm data to obtain new data vector $\{C_1, C_2, C_3, \ldots, C_m\}$; m being the sum of the number n of original algorithm data and the number of added encryption coefficients;

the weights corresponding to the data vector $C_1, C_2, C_3, \ldots C_m$ being respectively $\beta_1, \beta_2, \beta_3 \ldots \beta_m$, and the sum of all the weights being 1 or approaching 1;

arranging weights $\beta_1, \beta_2, \beta_3 \ldots \beta_m$, according to M types of orders, and data vector according to order of $C_1, C_2, C_3, \ldots C_m$;

for a j-th order arrangement of weights, multiplying all weights β with data vector C at corresponding position respectively, summing the results of the multiplication to obtain the corresponding encryption coefficient $D_j$.

5. The data processing method as claimed in claim 1, wherein the step of arranging weights $\alpha_1, \alpha_2, \alpha_3 \ldots \alpha_n$ according to N types of orders is specifically as:

one or more combinations of arranging weights α in the following orders: decreasing order according to subscript n, increasing order according to subscription n, forward arrangement according to a certain value of subscription n, backward arrangement according to a certain value of subscription n, odd numbers first followed by even numbers, and even numbers first followed odd numbers.

6. The data processing method as claimed in claim 4, wherein the step of arranging weights $\alpha_1, \alpha_2, \alpha_3 \ldots \alpha_n$ according to N types of orders is specifically as:

one or more combinations of arranging weights α in the following orders: decreasing order according to subscript n, increasing order according to subscription n, forward arrangement according to a certain value of subscription n, backward arrangement according to a certain value of subscription n, odd numbers first followed by even numbers, and even numbers first followed odd numbers.

7. The data processing method as claimed in claim 4, wherein the step of arranging weights $\beta_1, \beta_2, \beta_3 \ldots \beta_m$ according to M types of orders is specifically as:

one or more combinations of arranging weights β in the following orders: decreasing order according to subscript m, increasing order according to subscription m, forward arrangement according to a certain value of subscription m, backward arrangement according to a certain value of subscription m, odd numbers first followed by even numbers, and even numbers first followed odd numbers.

8. The data processing method as claimed in claim 1, wherein the default range used in step S2 to select from the original algorithm data is a continuous range.

9. The data processing method as claimed in claim 1, wherein the default range used in step S2 to select from the original algorithm data comprises discrete ranges.

10. The data processing method as claimed in claim 1, wherein the method further comprises, after step S3:

using a decryption algorithm to decrypt the encrypted algorithm data, and the decryption algorithm being a inverse computation of the encryption algorithm.

* * * * *